（12） United States Patent
Tian

(10) Patent No.: US 12,062,953 B2
(45) Date of Patent: Aug. 13, 2024

(54) AIRCRAFT MOTOR DRIVER

(71) Applicant: Autoflight (Kunshan) Co., Ltd., Kunshan (CN)

(72) Inventor: Yu Tian, Hong Kong SAR (CN)

(73) Assignee: AUTOFLIGHT (KUNSHAN) CO., LTD., Jiangsu Province (CN)

( * ) Notice: Subject to any disclaimer, the term of this patent is extended or adjusted under 35 U.S.C. 154(b) by 0 days.

(21) Appl. No.: 18/193,458

(22) Filed: Mar. 30, 2023

(65) Prior Publication Data
US 2023/0391461 A1    Dec. 7, 2023

(30) Foreign Application Priority Data
Mar. 30, 2022   (CN) .......................... 202210329376.1

(51) Int. Cl.
| | | |
|---|---|---|
| *H02K 11/33* | (2016.01) | |
| *H02K 5/20* | (2006.01) | |
| *H02K 9/02* | (2006.01) | |
| *H02K 9/04* | (2006.01) | |
| *H02K 11/00* | (2016.01) | |
| *H02K 11/30* | (2016.01) | |
| *B64D 27/24* | (2006.01) | |

(52) U.S. Cl.
CPC ............... *H02K 11/33* (2016.01); *H02K 5/20* (2013.01); *H02K 9/02* (2013.01); *H02K 9/04* (2013.01); *H02K 11/0094* (2013.01); *H02K 11/30* (2016.01); *B64D 27/24* (2013.01)

(58) Field of Classification Search
CPC .......... H02K 11/33; H02K 11/30; H02K 5/20; H02K 11/0094; H02K 11/38; H02K 9/00; H02K 9/02; H02K 9/04; H02K 9/06; H02K 9/08; H02K 9/10; B64D 27/24
USPC ........ 310/68 R, 71, 52, 58, 60 R, 62, 63, 64
See application file for complete search history.

(56) References Cited

U.S. PATENT DOCUMENTS

| | | | |
|---|---|---|---|
| 11,025,139 B2 * | 6/2021 | Li ................. | H05K 1/0209 |
| 2017/0264167 A1 * | 9/2017 | Tahara ............ | H02K 11/33 |
| 2021/0222696 A1 * | 7/2021 | Williams ......... | H02K 9/06 |
| 2021/0351670 A1 * | 11/2021 | Saber .............. | H02K 5/225 |

\* cited by examiner

*Primary Examiner* — Alexander A Singh
(74) *Attorney, Agent, or Firm* — WPAT LAW, P.C.; Anthony King

(57) ABSTRACT

An aircraft motor driver having a power board and a motor, wherein the power board includes a base plate and a power element, and the power element is located at the edge of the base plate. The motor is located near the middle of the power board and is electrically connected to the terminal block on the base plate, and the motor driver is provided with an airflow circulation channel for providing the airflow used for heat dissipation of the power element. The aircraft motor driver arranges the power element on the outer edge of the power board, so that the motor of the driver can be assembled near the middle of the power board, reducing the assembly difficulty and assembly volume of the driver, and, so that the power board can be cooled by air cooling mode of air convection.

9 Claims, 5 Drawing Sheets

AIRCRAFT MOTOR DRIVER

FIELD OF THE DISCLOSURE

The invention relates to the field of driver, especially, relates to an aircraft motor driver.

BACKGROUND OF THE INVENTION

An electric aircraft is an aircraft driven by an electrically powered propulsion system instead of being driven by internal combustion engine power. In existing electric aircrafts, the power board structure of the motor driver is relatively single, mostly rectangular, with the driver IC on one side and the power semiconductor on the other side, and the three-phase lines are led by the open window on the side of the board. This structure layout meets the needs of small unmanned aerial vehicles (UAVs) and is easy to assemble on the arm. However, it is not conducive to heat dissipation, and the high temperature rise of the power semiconductor limits its performance, resulting in lower power density. The disadvantages of this conventional layout are particularly prominent due to the heavier large vehicles and the higher power output required by the power system. Therefore, most of them need to set up separate water-cooling device for heat dissipation, resulting in a more complex aircraft structure, weight, volume and cost are increased to varying degrees.

SUMMARY OF THE INVENTION

The purpose of the present invention is to provide an aircraft motor driver, which is capable of dissipating heat by air cooling, which can improve the compactness of the driver structure and reduce the size, weight and structural complexity of the driver and the aircraft.

To reach the purpose, the invention uses the following technical solution:

an aircraft motor driver, characterized in that it comprises:

a power board, the power board comprises a base plate and a power element, the power element is located at the edge of the base plate;

a motor, the motor is located near the middle of the power board and electrically connected to the terminal block on the base plate, the motor drive is provided with an airflow circulation channels for providing the airflow used for heat dissipation of the power element.

Optionally, the power element comprises a number of groups of transistors, each group of the transistors is connected to the terminals via copper-clad wires, the copper-clad wires are weld with conductive strips.

Optionally, the front and back sides of the base plate are provided with the conductive strips; the conductive strips are oppositely arranged on the front and back sides of the bottom plate.

Optionally, the conductive strip is a tinned copper strip; the tinned copper strip is laminated to the copper-clad wire.

Optionally, the conductive strip is located on one side of the transistor near the center of the base plate; the terminal block is located on one side of the conductive strip near the center of the base plate.

Optionally, the transistor is vertically arranged on the plane of the base plate; the heat dissipation surface of the transistor is vertical to the plane of the base plate; the heat dissipation surface of the transistor faces the outer periphery of the base plate.

Optionally, the power element further comprises a number of capacitors, the capacitor is located on one side of the conductive strip near the center of the base plate; the terminal block is located between two adjacent capacitors.

Optionally, the transistor, the conductive strip, the capacitor and the terminal block are equally spaced on the base plate.

Optionally, the base plate is a square hexagonal structure or a circular structure; the transistor, the conductive strip and the capacitor are distributed in a centrosymmetric manner with the center of the base plate as the origin.

Optionally, the power board further comprises a power bus positive electrode and a power bus negative electrode for providing a direct current power supply, and a signal line for transmitting a control signal.

The invention can have the beneficial effects that:

The invention provides an aircraft motor driver, the power element is located at the edge of the base plate, the motor is located near the middle of the power board where the heat generation is low, and the heat dissipation at the edge of the power board is ensured by convection air. Compared with the water-cooled heat dissipation method, this design greatly reduces the structural complexity of the motor driver and improves the compactness of the motor driver, thus reducing the cost, volume and weight of the driver and the aircraft.

Figure 1:
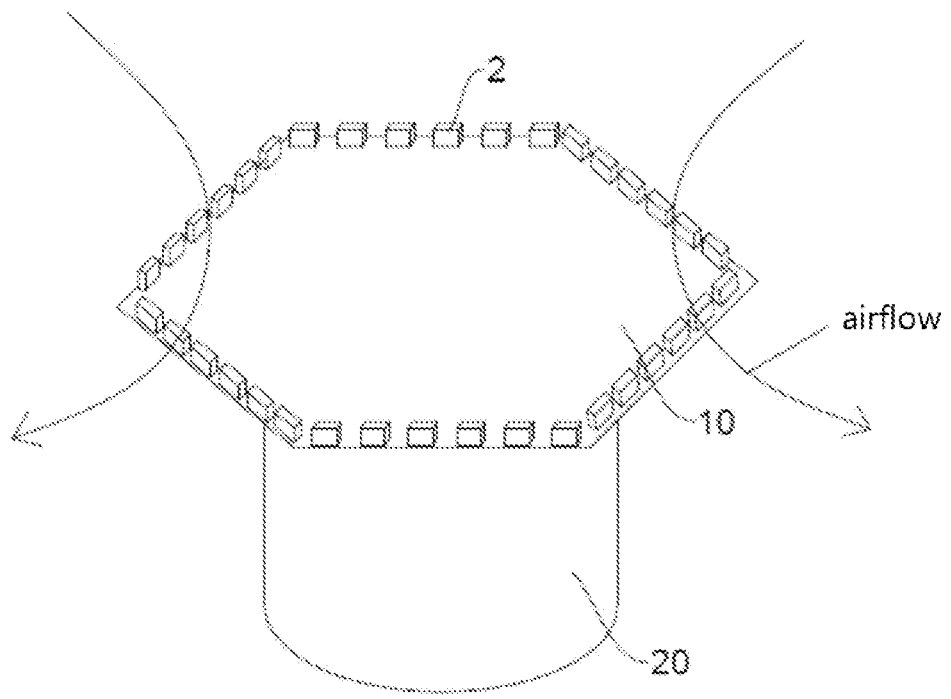
FIG. 1 shows the overall structure diagram of the aircraft motor driver described in the invention.

The following call-out list of elements in the drawing can be a useful guide when referencing the elements of the drawing figures:

10. power board; 101. base plate; 1. RC circuit; 2. transistor; 3. power bus positive electrode; 4. power bus negative electrode; 5. signal line; 6. capacitor; 7. conductive strip; 8. terminal block; 9. mounting hole; 20. motor.

DETAILED DESCRIPTION

The invention is further described in detail with the attached drawings and embodiments. It can be understood that the specific embodiments described here can be used to explain the invention and can or cannot be used to limit the invention. In addition, it should be noted that for the convenience of description, the attached drawings may only show part of the structure related to the invention, not the whole structure.

In the description of the invention, the terms "linked", "connected", and "fixed" should be understood in a broad sense unless otherwise specified and limited, for example, they can be fixed connections, detachable connections, or integrated; It can be mechanical connection or electrical connection. It can be directly connected, or indirectly connected through intermediate media, or it can be the internal connection of two components or the interaction between two components. For those skilled in the art, the specific meaning of the above terms in the invention can be understood in a specific case.

In this invention, unless otherwise specified and defined, the first feature is "on" or "under" the second feature can include the direct contact between the first and second features, or the contact between the first and second features is not direct contact but through other features between them. Furthermore, the first feature is "above", "over" and "on" the second feature includes the first feature is directly above and diagonally above the second feature, or simply indicates that the first feature is horizontally higher above the second feature. The first feature is "below", "underneath" and "under" the second feature includes the first feature is directly below and diagonally below the second feature, or simply indicates that the first feature is less than the horizontal height of the second feature.

In the description of this embodiment, the terms "up", "down", "right", and other orientation or position relations are based on the orientation or position relations shown in the attached drawings, which can be for the convenience of description and simplified operation, and can or cannot be indicating or implying that the device or element referred to must have a specific orientation, be constructed and operated in a specific orientation. They can or cannot be understood as restrictions on the invention. In addition, the terms "first" and "second" are only used for descriptive distinction and have no special meaning.

At present, the biggest challenge facing the development of various types of electric aircrafts is the lack of performance of the electric propulsion system to meet the requirements of the usage of large weight aircrafts. In the existing technology, in order to ensure heat dissipation, the power elements are mostly scattered on the power board, and at the same time, limited by the size of the electric aircraft, the power board is difficult to maintain sufficient distance from the motor for heat dissipation, while the output power required by the aircraft is large. In order to avoid the performance of the power elements from being affected by excessive heat, the power board mostly needs to be dissipated by setting up a water-cooling device separately, and the arrangement of the water cooling device substantially increases the size and weight of the electric aircraft, which affects the performance of the electric aircraft, and increases the complexity and manufacturing cost of the electric aircraft. For this reason, the present embodiment provides a motor driver for an electric aircraft that can dissipate heat by air cooling and has a compact installation structure with reduced size and weight.

As shown in FIG. 1, the aircraft motor driver provided in this embodiment includes a power board 10 and a motor 20, wherein, the power board 10 includes a base plate 101, a power element and three phase lines of terminal blocks 8, the power element is located at edge of the front side of the base plate 101, the terminal blocks 8 pass through the front and back sides of the base plate 101; the motor 20 is located on the back side of the base plate 101, near the middle of the power board 10, and is electrically connected with the terminal block 8 on the back of the base plate 101. Optionally, the end size of the motor 20 is smaller than the area of the power board 10, and the outer edge of the power board 10 is located at the outer periphery of the motor 20; the periphery of the motor driver is provided with hollow structure, which connects to the inside and outside of the driver to form a channel for airflow circulation, and during the movement of the aircraft, the airflow enters the internal cavity of the driver through the airflow circulation channel, flows through the edge position of the power board 10, and conducts heat exchange with the power element to achieve the purpose of cooling the edge of the power board 10.

The aircraft motor driver, by setting the power element with high heat generation at the outer edge of the power board 10, makes the middle of the power board 10 have very low heat generation, so that when assembling the driver, the motor 20 of the driver can be installed close to the middle of the power board 10, and the power element distributed at the outer edge of the power board 10 can ensure the air circulation at the edge of the power board 10 through the hollow structure, so as to achieve the heat dissipation purpose. However, the power element has the largest distribution circumference on the power plate 10, and the edge position has a weak blocking effect on the air flow. Therefore, in this embodiment, the temperature of the power board 10 can be kept within the reliable working range by relying on the convection formed during the flight of the aircraft, replacing the water-cooled cooling structure in the existing aircraft, which greatly reduces the weight, volume and structural complexity of the driver and is very suitable for electric aircraft applications. At the same time, while eliminating the water-cooled cooling structure, the motor 20 can be installed close to the middle of the power board 10, which can further improve the structural compactness of the motor driver and reduce the overall size of the driver as well as the difficulty of assembly.

Figure 2:
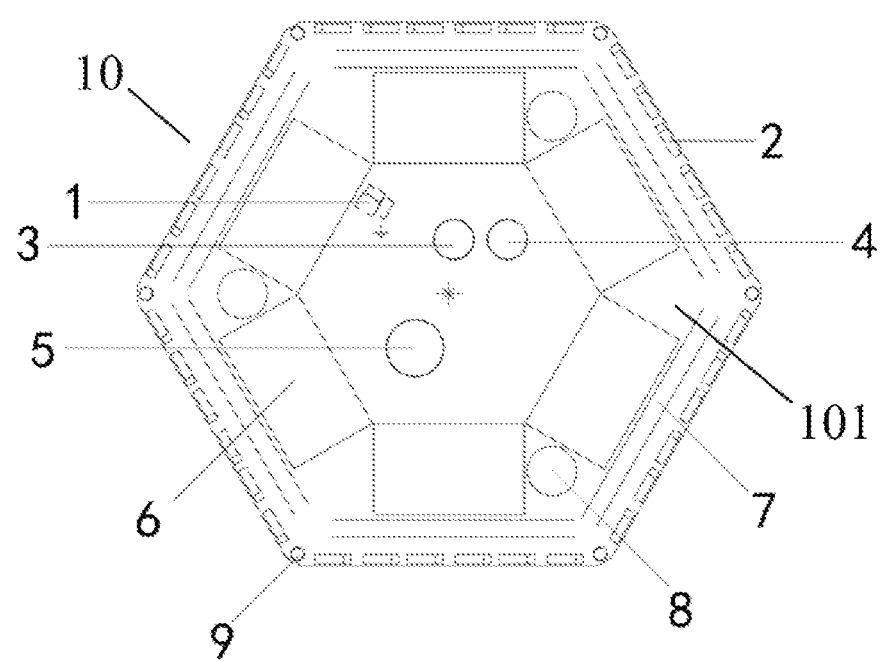
FIG. 2 shows the front structure diagram of the power board involved in the embodiment of the invention.

Referring to FIG. 2, in this embodiment, in addition to the base plate 101, power elements and terminal blocks 8, the power board 10 also includes the power bus positive electrode 3 and the power bus negative electrode 4 welded on the base plate 101 and connected to the positive and negative terminals of the direct current power supply of the driver, the signal line 5 connected to a control module such as a control terminal or a control board of the driver to deliver control signals, and a resistance-capacitance absorption circuit 1 for anti-jamming. The power element includes a number of transistors 2 and a number of capacitors 6. The power board 10, the power bus positive electrode 3, the power bus negative electrode 4, the resistance-capacitance absorption circuit 1 and the signal line 5 are all distributed in the middle of the base plate 101. The transistor 2, as the main heat source and noise interference source, is distributed at the board side. In addition to the heat dissipation requirements, it can also reduce the interference to the circuit inside the board.

As a preferred solution, in this embodiment, the base plate 101 selects a square hexagonal structure or a circular structure, preferably a regular hexagonal structure that is more convenient for processing, and is a double-sided PCB board structure. The square hexagonal structure is close to a circular shape, which is convenient for the motor installation and the internal air duct heat dissipation of the aircraft in cooperation with the internal structure of the aircraft; the material of PCB board can be aluminum substrate, copper substrate, or ceramic substrate with better thermal conductivity and new composite substrate according to needs. In this embodiment, the hexagon of the base plate 101 is provided with chamfered corners, and mounting holes 9 are opened at the hexagon for the assembly and fixing of the base plate 101.

Optionally, in this embodiment, each phase of the terminal block 8 and its corresponding transistor 2 through the copper-clad wire connection in the base plate 101, since the main current circuit of the power board 10 is between transistor 2 and terminal block 8, with high heat generation, therefore, in this embodiment, a conductive strip 7 is welded on the copper-clad wire which connects to the transistor 2 and the terminal block 8. The conductive strip 7 has a certain width and thickness, which can increase the cross-sectional area of the current conductor, improve the overcurrent capacity, and reduce the heat value. At the same time, the conductive strip 7 and the transistor 2 with higher heat generation are evenly distributed at the edge of the base plate 101 to reduce the heat in the middle of the power board 10.

Figure 3:
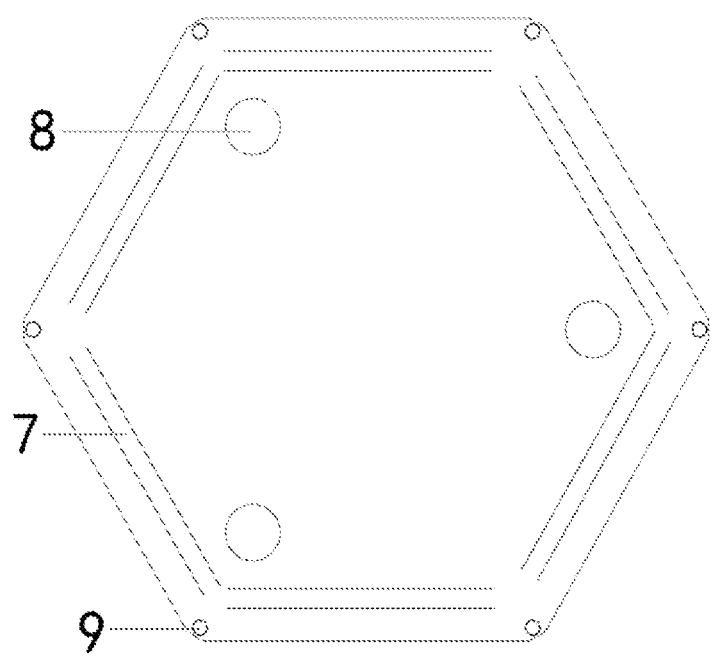
FIG. 3 shows the back structure diagram of the power board involved in the embodiment of the invention.

Referring to FIG. 2 and FIG. 3, as a preferred solution, in this embodiment, the front and back sides of the base plate 101 are provided with the conductive strips 7, and conductive strips (7) are oppositely arranged on the front and back sides of the base plate; specifically, the conductive strip 7 is a rectangular tinned copper strip, more specifically, in this embodiment, the length, width and thickness of a single rectangular tinned copper strip is 23 mm, 6 mm and 1.5 mm. In this embodiment, the tinned copper strip and the copper-clad wire can be connected and fixed by opening a window and adding tin on the base plate 101, which reduces the processing difficulty and makes the tinned copper strip and the copper-clad wire fully fit.

In this embodiment, by providing the conductive strip 7 on the copper-clad wire to enhance the cross-sectional area of the high-current conductor, reduce the conductor's internal resistance, improve the conductor's over-current capability, reduce the conductor's heat generation, while the current conductor from the copper-clad wire covered under the solder resist layer to the exposed tinned copper strip, reduce its heat generation while improving its heat dissipation capability. And it can be set aside for the line without the conductive strip 7 of the conductor section of the base plate 101 area to expand the width of the copper conductor, so that the power board 10 can ensure the over-current capacity and heat dissipation capacity, on the premise of obtaining higher volume utilization and power density. Specifically, for example, in this example, the large aircraft motor driver volume is 240 mm*209.8 mm*60 mm, bus voltage input is 288V to 405V, each phase output current peaks up to 500 A, energy density is much higher than the general motor drive power board.

Continuing to refer to FIG. 2, in this embodiment, the transistor 2, the conductive strip 7 and the capacitor 6 are evenly arranged at equal intervals in accordance with the heat generation along the layer from the outside to the inside circle by circle, so that power board 10 forms an arrangement pattern of gradually increasing heat generation from the inside to the outside to further ensure the heat dissipation effect of power board 10.

Optionally, in this embodiment, the transistor 2 is a low EMI insulated double gate transistor (IGBT) that can be placed vertically at the edge of the base plate 101 so that its heat sink surface is perpendicular to the plane of the base plate 101 and the heat sink surface faces the outer periphery of the base plate 101 to facilitate heat dispersion outside the base plate 101. In actual use, the heat sink surface is either the side of the transistor 2 as a power semiconductor, the side of the metal heat dissipation surface of transistor 2, or the side with the largest area of transistor 2, etc.

As a preferred solution, in this embodiment, the capacitors 6 can be direct current link capacitors (DC-Link), and the capacitors 6 are arranged in a head-to-tail manner, and the adjacent capacitors 6 form a fan-shaped horn, the positive terminal of the capacitors 6 are connected to the power bus positive electrode 3, and the negative terminal of the capacitors 6 are connected to the power bus negative electrode 4; the terminal block 8 is located within the fan-shaped horn formed by the two adjacent capacitors 6. The location of capacitor 6 is chosen not only for heat dissipation needs, but also for size considerations. The concentration of capacitor 6 in the inner circle enables the use of larger standard package DC-LINK capacitors without the need for additional custom capacitors 6, and the larger capacity of DC-LINK capacitors as well as their discharge capacity provides margin.

As another preferred solution, in this embodiment, the terminal block 8 is selected cylindrical gold-plated copper head, and the terminal block 8 penetrates through the front and back sides of the base plate 101. The gold-plated copper head instead of the existing connection method of windowing and welding at the edge of the board, firstly it can reduce its heat and manufacturing difficulties, secondly it can facilitate the disconnection between the power board 10 and the motor 20.

Referring to FIG. 2, in this embodiment, capacitors 6, conductive strips 7 and transistors 2 are divided into six groups with the same composition structure, and the six groups of composition structure are arranged in a 60° fan arrangement on the six edges of base plate 101 with the center of base plate 101 as the origin, so that capacitors 6, conductive strips 7 and transistors 2 form an overall centrally symmetrical layout.

Specifically, in this embodiment, the number of capacitors 6 is 6, the number of conductive strips 7 is 6, and the number of transistors 2 is 36. A capacitor 6, a conductive strip 7 and the bridge-arm composed of 6 parallel transistors 2 are taken as a group of composition structures. The whole power board 10 consists of 6 composition structures.

The power board 10 is arranged symmetrically in the center to make the current loop impedance of the three phases and the six bridge-arms of the power board 10 consistent, to ensure the current sharing effect of the power board 10, and to avoid the uneven current and heat generation caused by the uneven current, which causes the transistor 2 with high current to exceed the bearing temperature when the power is high, thus triggering the temperature protection, reducing the performance release of transistor 2, and even causing the direct failure of transistor 2.

Figure 4:
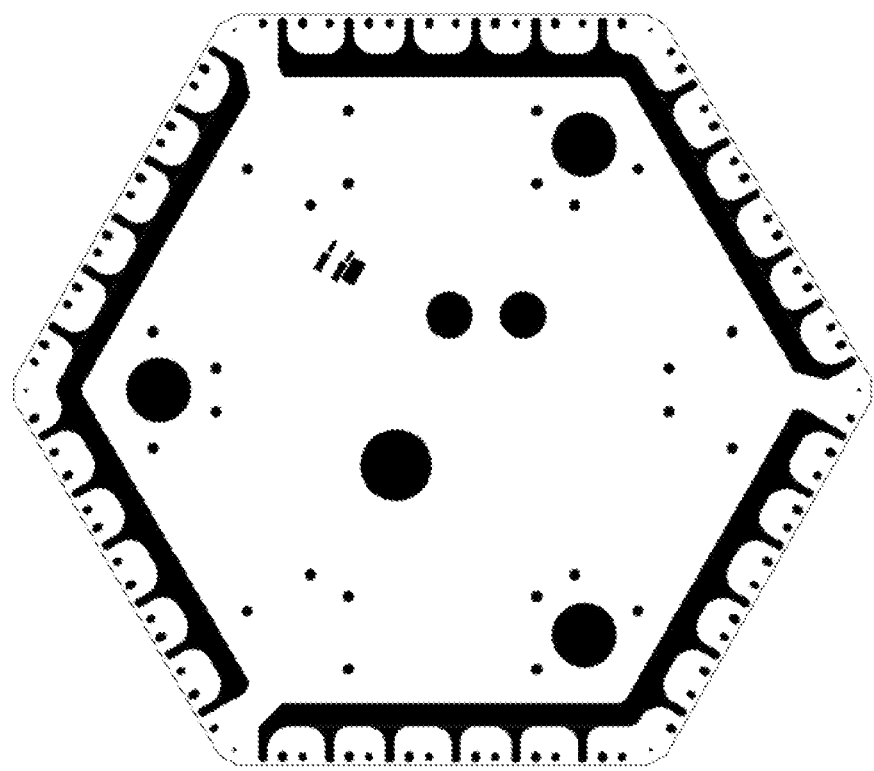
FIG. 4 shows the schematic diagram of the front windowing area of the power board involved in the embodiment of the invention.
Figure 5:
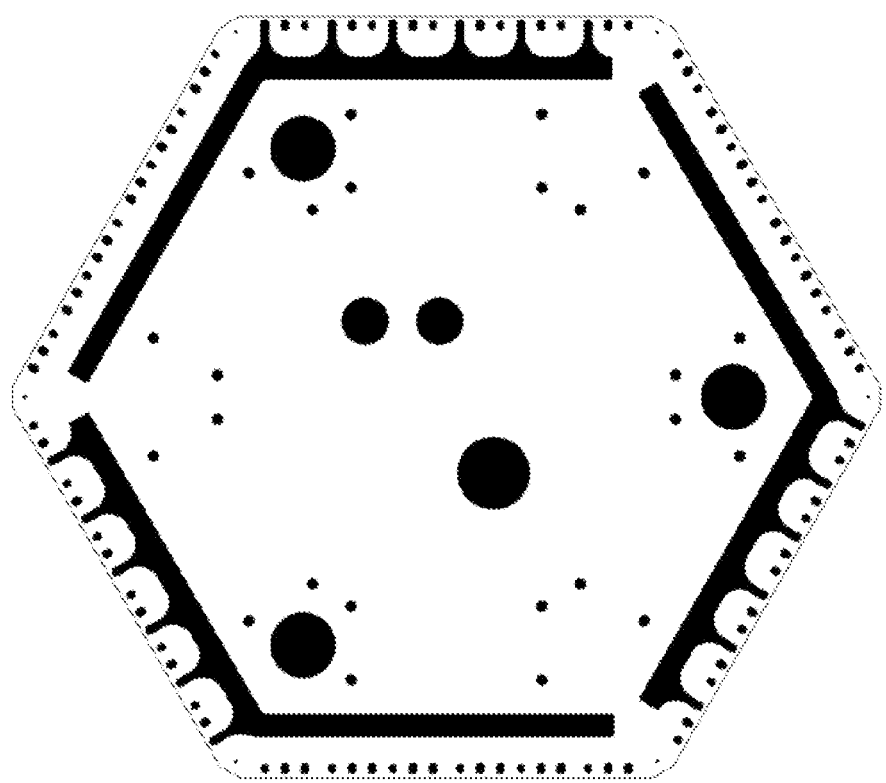
FIG. 5 shows the schematic diagram of the rear windowing area of the power board involved in the embodiment of the invention.

Referring to FIG. 4 and FIG. 5, in this embodiment, the six bridge-arms on the power board 10 are composed of multiple transistors 2 in parallel. The two adjacent bridge arms are connected end to end through conductive strip 7. The terminal block 8 is located in the inner circle of the junction of the two groups of conductive strips 7, which is connected to the junction of the two adjacent bridge-arms. The terminal block 8 of each phase is connected to the drive motor. The two ends of the two adjacent bridge-arms are connected to power bus positive electrode 3 and the power bus negative electrode 4 respectively, the on-off of the three-phase bridge-arm can be controlled by transistor 2. The transistor 2 is controlled by the control module of the drive, which selectively controls the connection or disconnection of the terminal block 8 and the direct current power module of the drive. In this embodiment, the bridge-arm formed by the parallel connection of multiple transistors 2 can play the role of current shunt, thus reducing the heat generation of the individual transistor 2 and avoiding the failure of transistor 2 due to overheating.

Obviously, the above embodiments of the invention are only intended to clearly illustrate the examples of the invention, not to limit the implementation of the invention. For those skilled in the art, they can make various obvious changes, readjustments and replacements without leaving the scope of protection of the invention. It is unnecessary and impossible to enumerate all the implementation methods here. Any modification, equivalent replacement and improvement made within the spirit and principle of the invention shall be included in the scope of protection of the claims of the invention.

What is claimed is:

1. An aircraft motor driver, characterized in that it comprises:
   a power board (10);
   the power board (10) having a base plate (101) and a power element;
   wherein the power element is located at an edge of the base plate (101);
   a motor (20);
   wherein the motor (20) is located near a middle of the power board (10) and electrically connected to a terminal block (8) on the base plate (101);
   wherein the motor driver is provided with an airflow circulation channel to provide airflow used for heat dissipation of the power element; and
   wherein the power element comprises a plurality of group of transistors (2), each group of said plurality of group of transistors (2) is connected to the terminal block (8) via copper-clad wires, the copper-clad wires are welded with conductive strips (7).

2. The aircraft motor driver according to claim 1, characterized in that a front side and a back side of the base plate (101) are provided with the conductive strips (7); the conductive strips (7) are oppositely arranged on the front and back sides of the base plate (101).

3. The aircraft motor driver according to claim 1, characterized in that the conductive strip (7) is a tinned copper strip; the tinned copper strip is laminated to the copper-clad wire.

4. The aircraft motor driver according to claim 1, characterized in that the conductive strip (7) is located on one side of one of said transistor (2) near a center of the base plate (101); wherein the terminal block (8) is located on one side of the conductive strip (7) near said center of the base plate (101).

5. The aircraft motor driver according to claim 1, characterized in that one of said transistors (2) is vertically arranged on a plane of the base plate (101); wherein a heat dissipation surface of the transistor (2) is vertical to the plane of the base plate (101); wherein the heat dissipation surface of the transistor (2) faces an outer periphery of the base plate (101).

6. The aircraft motor driver according to claim 1, characterized in that the power element further comprises a plurality of capacitors (6), the plurality of capacitor (6) is located on one side of the conductive strip (7) near a center of the base plate (101); wherein the terminal block (8) is located between two adjacent capacitors (6) of said plurality of capacitors (6).

7. The aircraft motor driver according to claim 6, characterized in that the plurality of transistor (2), the conductive strip (7), the capacitor (6) and the terminal block (8) are equally spaced on the base plate (101).

8. The aircraft motor driver according to claim 7, characterized in that the base plate (101) is a square hexagonal structure or a circular structure; the plurality of transistor (2), the conductive strip (7) and the capacitor (6) are distributed in a centrosymmetric manner with the center of the base plate (101) as the origin.

9. The aircraft motor driver according to claim 1, characterized in that the power board (10) further comprises a power bus positive electrode (3) and a power bus negative electrode (4) for providing a direct current power supply, and a signal line (5) for transmitting a control signal.

* * * * *